Feb. 6, 1951 L. T. MILLER 2,540,628
OIL TEMPERATURE CONTROL VALVE
Filed Oct. 26, 1944 7 Sheets-Sheet 1

INVENTOR.
Leslie T. Miller
BY
Donald W. Farrington
ATTORNEY

Feb. 6, 1951  L. T. MILLER  2,540,628
OIL TEMPERATURE CONTROL VALVE
Filed Oct. 26, 1944  7 Sheets-Sheet 3

INVENTOR.
Leslie T. Miller
BY
Donald W. Farrington
ATTORNEY

Feb. 6, 1951     L. T. MILLER     2,540,628
OIL TEMPERATURE CONTROL VALVE Filed Oct. 26, 1944     7 Sheets-Sheet 6

INVENTOR.
Leslie T. Miller
BY
Donald W. Farrington
ATTORNEY

Patented Feb. 6, 1951

2,540,628

UNITED STATES PATENT OFFICE 2,540,628

OIL TEMPERATURE CONTROL VALVE

Leslie T. Miller, Stoneleigh, Md., assignor to The Glenn L. Martin Company, Middle River, Md., a corporation of Maryland Application October 26, 1944, Serial No. 560,474

7 Claims. (Cl. 236—34.5)

Primarily, this invention relates to a method and apparatus for maintaining the oil temperature in the lubricating system of an internal combustion engine system within a narrow range, and more particularly to such a system in which the excessive oil pressures prevailing during the initial starting and warm-up period of the engine are eliminated.

This application is a continuation-in-part of application Serial No. 414,005, filed October 7, 1941, now Patent No. 2,374,639, dated April 24, 1945.

In operating internal combustion engines, especially aircraft engines, it is essential that the temperature of the lubricating oil in the engine be maintained at a relatively constant temperature for optimum engine operation. Not only must the oil be quickly brought up to this desired temperature, but throughout the flight of the aircraft, it must be maintained and not permitted to become either too hot or too cool.

Another important feature of the present system and apparatus thereof is the substantially complete removal of excessive oil pressures which are prevalent when the oil is cold and the engine is first started up. In modern aircraft, warm-up chambers and oil coolers have been proposed, but due to the inherent construction of conventional oil coolers by which attempts have been made to maintain constant oil conditions, these coolers must not be subjected to pressures in excess of their structural limits. These structural limits can be increased but at great sacrifice as to weight. Heretofore, the pressures created by the cold oil have oftentimes burst these conventional types of coolers and resulted in great danger to the aircraft and crew.

Among the objects and advantages of the present method is the complete elimination of these hazards and the precise regulation and control of the oil temperature under all conditions, including initial starting, preliminary warm-up and actual flight.

It has been previously proposed to control oil temperature by a valve located at the inlet to the engine, this valve regulating the flow to the oil cooler or to a by-pass line to the oil tank. With such a valve, there is a considerable quantity of oil in the circuit between the oil cooler and the valve, including, as it does, the amount of oil in the tank; thus, it should be noted that this quantity of oil must pass through the valve before it can operate to change the amount of cooling to reduce the oil temperature. This lag results in uneven temperature and may result in a hazardous condition when the heat input from the engine to the oil is suddenly increased tremendously due to a change of operating conditions. By placing a thermostatic element immediately adjacent to the oil cooler, and preferably bolted thereto, this time lag is decreased, and the necessity for an additional line back to the oil tank is eliminated.

This invention contemplates the relieving of dangerous pressures after the engine has been first started, the warming up of the oil returning from the engine to bring it up to operating temperature, and the cooling of the oil should it attempt to exceed the desired temperature. In addition, the system and apparatus permit the automatic warming of the oil if during flight the cooler lowers its temperature to a degree below that desired for operation.

In the drawings:

Figures 13, 14 and 15 show a further modified form of temperature controlled valve similar in operation to the valve shown in Figures 4, 5 and 6 but adapted to be rotated by the oil temperature.

Figure 13 is a vertical cross section through this modified valve, while

Figures 16 and 17 show a further modified form of rotary valve corresponding to the valve illustrated in Figures 10 to 12, inclusive, but using a rotary valve plug instead of a sliding sleeve.

Referring now to Figures 1, 4, 5 and 6 of the drawings, numeral 1 denotes a multi-port thermostatically controlled valve comprising an outer casing 2 and an inner multi-ported reciprocating sleeve, or cylinder 3 adapted to receive movement from a thermostatic coil 4 attached to the inner sleeve 3 through linkage mechanism 5. As shown, the oil outlet port G discharges into a conduit 9 leading to an oil tank, or reservoir 10, from there it passes through conduit 11 to pump 12 and conduit 13 into an engine 14, from the engine back to the inlet port A of the control valve 1 through conduit 15.

Figure 1:
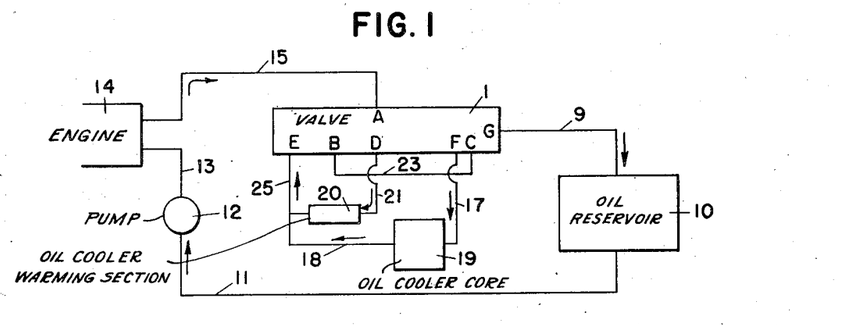
Figure 1 is a diagrammatical layout of the system showing a means of controlling the flow of oil during the different periods of operation.

An oil cooler core 19 of suitable capacity and thermal characteristics is joined to the control valve 1 and port F thereof by conduit 17, while the opposite side of the oil cooler core is provided with conduit 18 in communication with an oil cooler warming section 20 having a conduit 21 leading to port D. The conduit 18 is also joined to the control valve and port E thereof through conduit 25. A by-pass line 23 joins port C and B.

The sequence of operation of these several ports is controlled through the inner sliding valve sleeve 3 acting under the influence of the thermostatic device 4, and the particular flow through these ports will now be described in detail.

When starting up, the engine 14 is cold as is the oil supply in the system, including the tank 10. It will be obvious that if this high viscosity cold oil is permitted to circulate through the oil cooler core 19, or through warming section 20, the resistance built up in the system will be of such magnitude that there is great danger of rupturing the cooling elements of the cooler. Consequently, due to the action of the thermostatic device 4, the control valve 1 permits the cold oil to enter port A and freely pass out through port B through conduit 23 back into the valve through port C and be discharged therefrom through port G into the reservoir 10. Thus, during the initial start-up period when the oil is cold, it is permitted to pass through the system without undue restriction and without building up substantial pressures to thus completely eliminate its passage through either cooler core 19 or oil cooler warming section 20.

Figure 18:
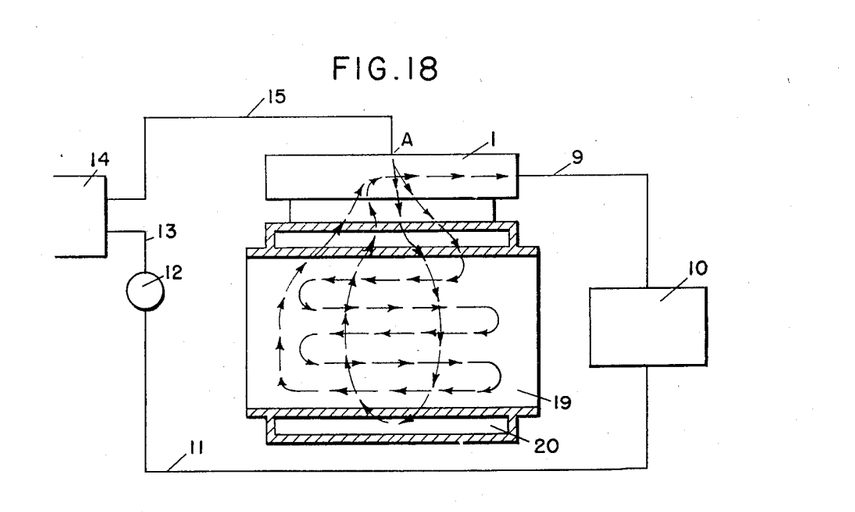
Figures 18 and 19 illustrate the lubricant control system and valve connected to an oil cooler of conventional design having the warming section surrounding the oil cooler core.

As the oil temperature starts to rise due to heat absorbed thereby from the engine 14, the temperature responsive element 4 moves the valve sleeve 3 to close off ports B and C and open ports D and E. When this occurs, the oil enters port A and flows out through port D into conduit 21 and passes through the oil cooler warming section 20, which in practice as shown in Figure 18, is combined with the oil cooler core 19 and forms in effect an oil cooler assembly, and thence through conduit 25 to port E to be discharged through outlet port G.

As the oil temperature further increases and reaches the desired operating temperature, the thermostatic device moves in such a manner as to close port D and open port F. When the valve is in this position, oil enters the port A, flows through port F, returns through the oil cooler core 19, through conduits 18 and 25 to port E from whence it passes through the open tubular portion of the valve and outlet G.

Figure 2:
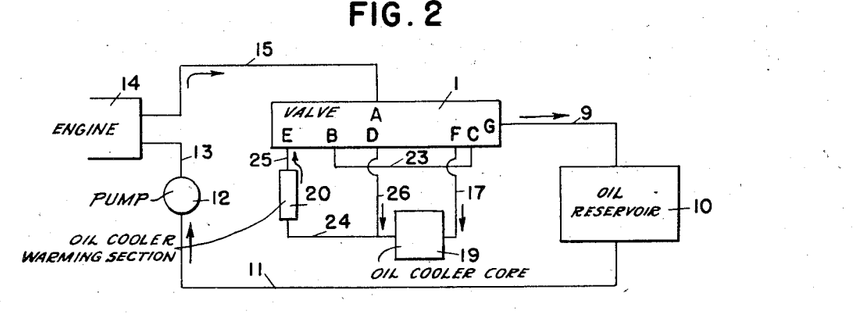
Figure 2 is a basically similar system to Figure 1 with means for circulating the oil through the warming section and through both the warming section and cooling core at a higher temperature.

The system illustrated in Figure 2 is quite similar to that described in explaining the operation of Figure 1. The major difference and furtherance of the present novel lubricating system shown in this figure is the means by which the oil cooler core and oil cooler warming section may be connected to the control valve in such a manner that the oil may selectively flow through the warming section at one temperature and through both the warming section and cooling core at a higher temperature.

With the arrangement of Figure 2, the oil cooler core 19 is joined to the control valve 1 and port F thereof by conduit 17, while the other side of the cooler core is connected by conduit 24 leading to the warming unit 20 and thence through conduit 25 to port E. The conduit 24 also communicates with the control valve port D by jointure with conduit 26.

In operation, as the oil temperature in the system starts to rise due to heat absorption from the initial operating period of the engine 14, the temperature responsive element 4 moves the inner valve cylinder 3 to close off ports B and C while opening ports D and E. When this occurs, the preliminarily heated oil enters port A through conduit 15 and flows around the valve cylinder and out through port D into conduits 26 and 24 through the warming section 20 and thence through conduit 25 to port E when it is discharged in the central bore of the valve and flows out of the valve through port G to the line 9 running to tank 10.

After the oil temperature rises and assumes the desired predetermined operating temperature, the thermal operator 4 moves the sleeve 3 to close port D and open port F. In this position, oil enters port A, flows around the sleeve and out through port F, then to the cooler core 19 through conduit 24 to the warming section 20, through conduit 25 to port E and thence into the central tubular bore of the valve and through discharge outlet G.

Figure 3:
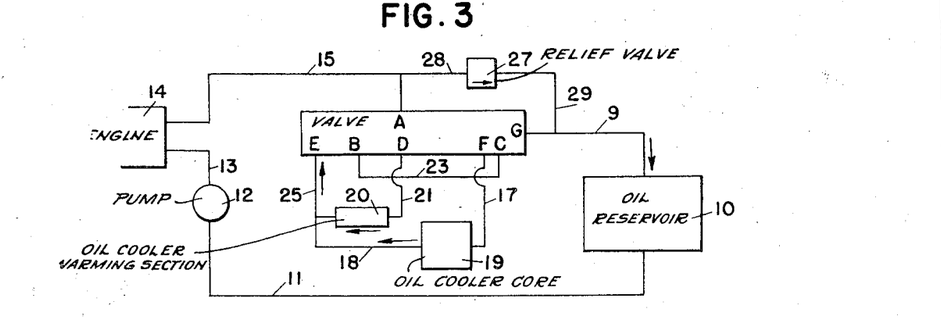
Figure 3 is also a similar system to that of Figure 1 but having a pressure relief valve therein for further protection against excessive pressures.

Figure 3 carries the improved lubricating system of Figure 1 further by adding the pressure relief valve 27 into the inlet line 15 and outlet line 9, whereby oil is relieved through conduit 28, relief valve 27 and conduit 29. Thus, if excessive pressures for any reason build up between inlet oil at port A and outlet port G, it may reach the relief valve and be by-passed around the control valve directly to reservoir 10. While the relief valve 27 has been shown external to the valve, it is obvious that it may be otherwise arranged if so desired so long as it is capable of communication with port A and port G.

Figure 5:
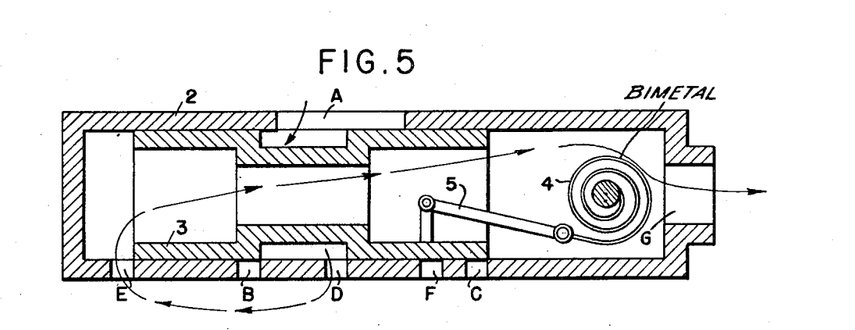
Figures 5 and 6 are similar to Figure 4 but showing the sliding regulating valve in varying positions.
Figure 6:
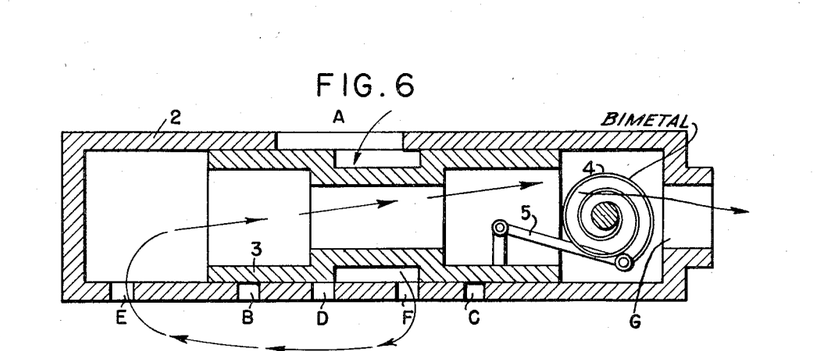
Figure 7:
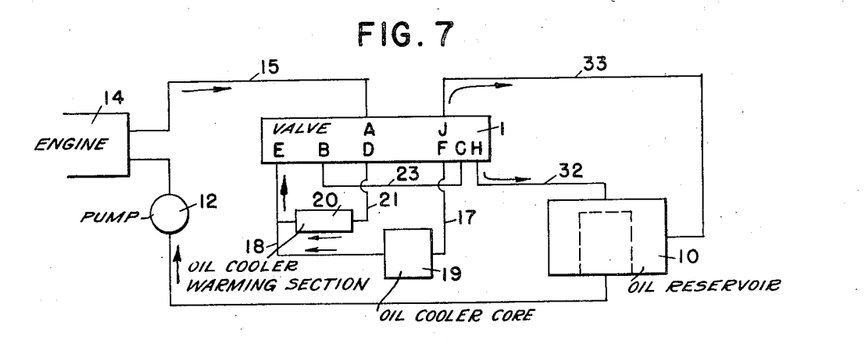
Figure 7 is a modification of the lubricating system disclosed in Figure 1 and includes additional ports for circulating the oil from the multiple control valve to the reservoir through a plurality of conduits.
Figure 8:
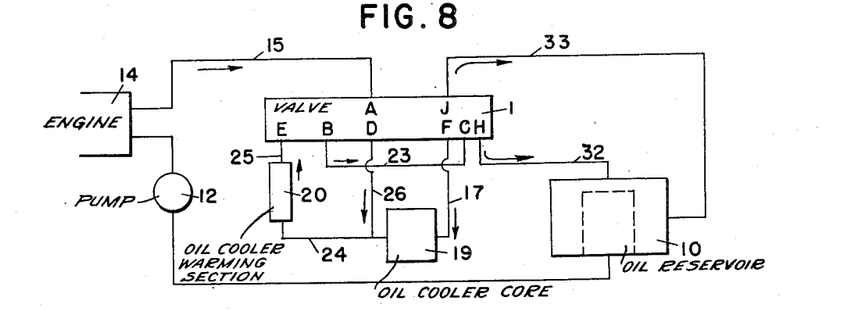
Figure 8 is a modification of the circuit shown in Figure 7 with the additional outlet ports.
Figure 9:
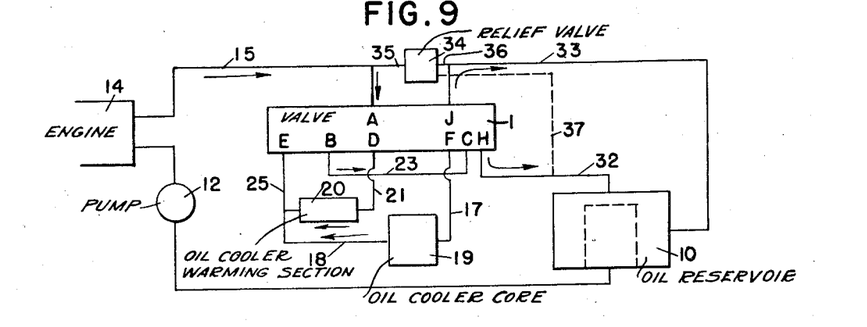
Figure 9 is a further modification of the circuit illustrated in Figure 7 embodying the dual oil return system in combination with a pressure relief valve and safety oil circuit.
Figure 10:
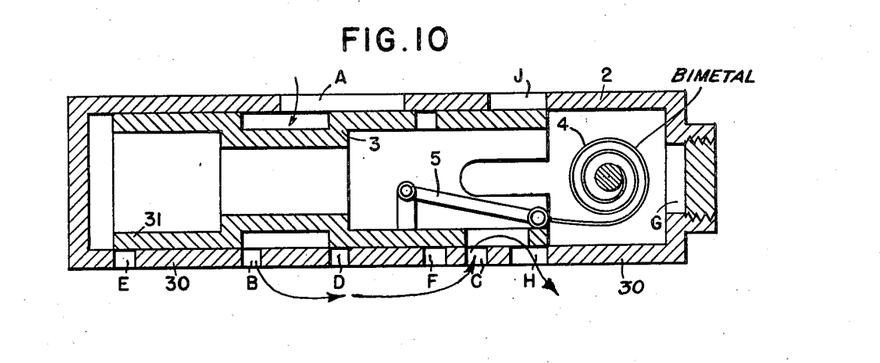
Figures 10, 11 and 12 are vertical cross sections of the modified sliding type of control valve used in combination with the duel return lubricating system shown in Figures 7, 8 and 9.
Figure 11:
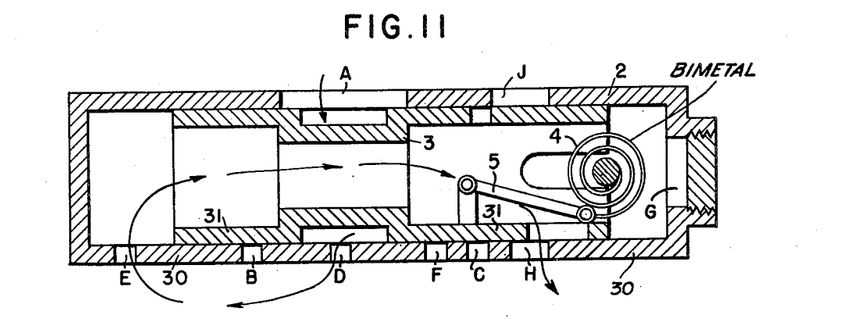
Figure 12:
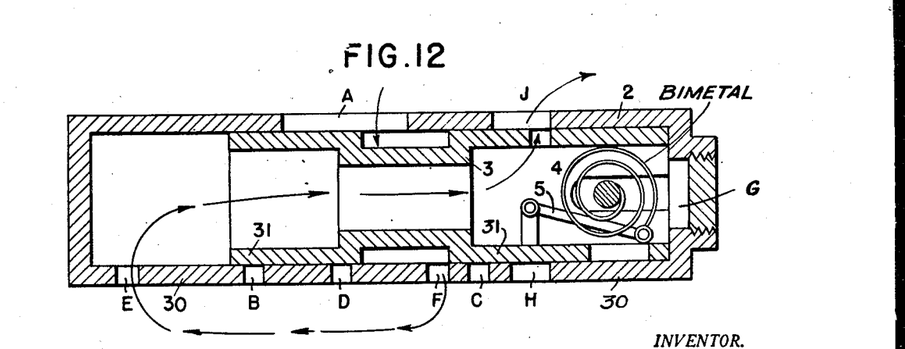

The modified systems shown in Figures 7, 8 and 9, together with the modified multi-port sliding control valve illustrated in Figures 10, 11 and 12, are fundamentally the same as the systems and control valve previously described in Figures 1, 2 and 3, and 4, 5 and 6, respectively.

The purpose of these modified systems is to readily control the oil under the conditions of starting and flight as above described with the added feature of control when it is desired that the oil lead to different sections of the oil tank. Under certain conditions, this further control is an advantage, and to accomplish the same, the control valve 1 is provided with additional ports H and J. The inner sliding cylinder 3 is also modified, see particularly Figures 10, 11 and 12.

Figure 4:
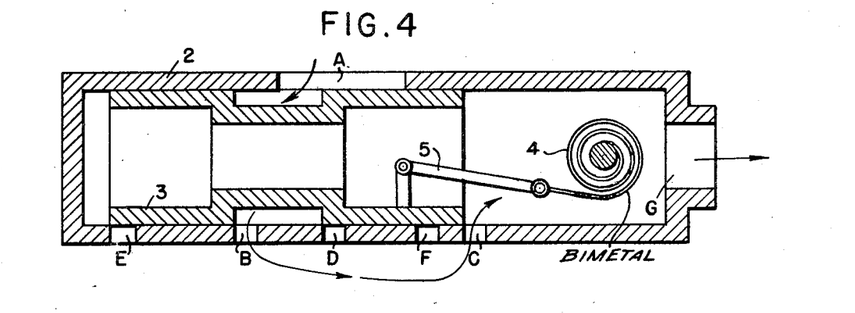
Figure 4 is a vertical cross section through a temperature regulating valve of the reciprocating type used to control these several conditions in a system as shown in Figure 1.
Figure 19:
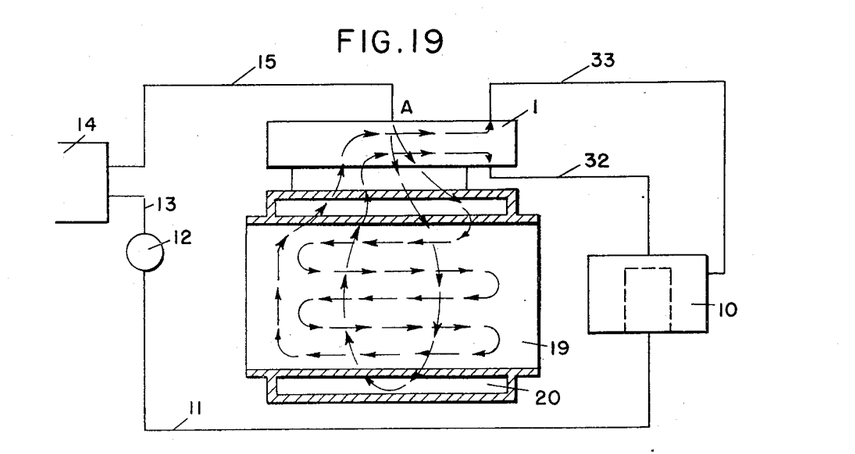

The reciprocating control valve in these figures performs the functions and operations of the valve shown in Figures 4, 5 and 6, although instead of allowing the oil to flow through outlet G and return to tank 10 through the single conduit 9, the oil at lower temperatures may flow out of port H, through conduit 32 to one section of the reservoir tank. At a second predetermined temperature, see Figure 12, the port H will be closed and port J opened; whereupon, the oil will flow out through port J, through conduit 33 to a different section of the tank 10. It is to be understood that at intermediate temperatures, or during a change of temperature, both ports H and J will be open and oil may return to the reservoir through both conduits 32 and 33. Figure 19 shows the control system and valve described above connected to the conventional oil cooler assembly.

In Figure 9, the modified system of Figure 7 is provided with a pressure relief valve 34 communicating with the inlet port A through conduit 35 and through conduit 36 with line 33 leading to the oil tank 10. However, the relief valve may be jointed to the other tank line 32 by conduit 37, shown in dotted lines.

Figure 13:
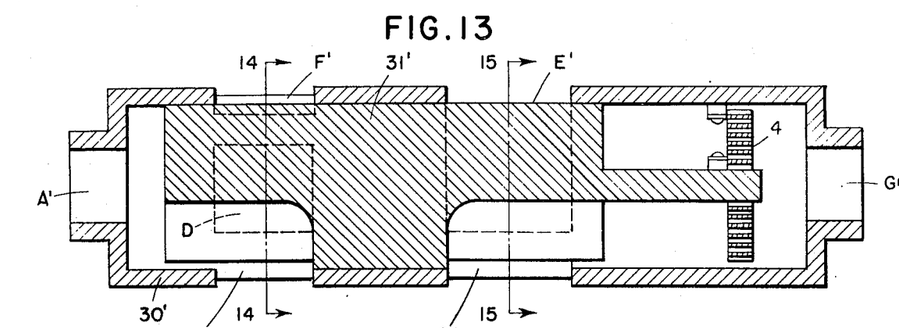
Figure 14:
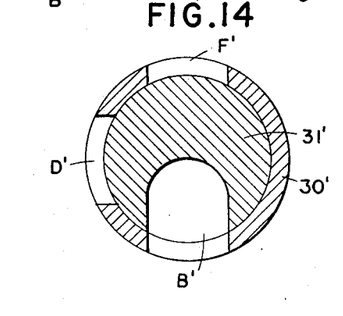
Figures 14 and 15 are vertical, transverse sections taken on lines 14—14 and 15—15, respectively, of Figure 13.
Figure 15:
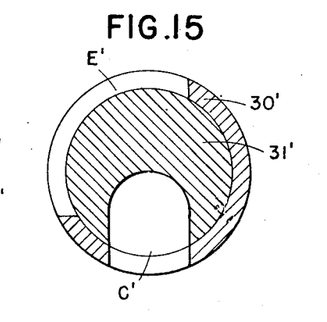

Figures 13, 14 and 15 show an arrangement of the valve shown in Figure 4 whereby the sleeve, or plug 31 is rotated instead of translated to register the ports. Ports on this valve have been lettered A', B', C', D', E', F' and G' and perform similar functions to those lettered A, B, C, D, E, F and G, respectively, of the valve shown in Figure 4. Thus, it is apparent that the valve shown in Figure 13 may be used in those circuits where the valve shown in Figure 4 has been used since it performs the same function.

Figure 16:
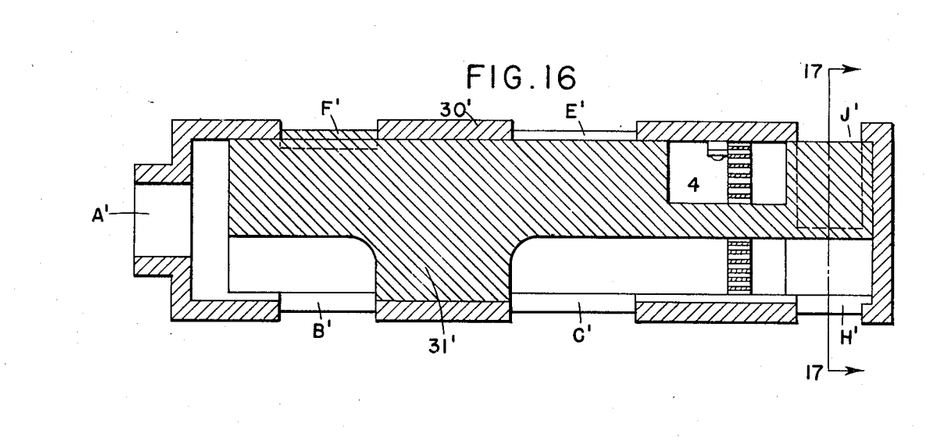
Figure 16 is a vertical, longitudinal cross section of the modified form of rotary valve.
Figure 17:
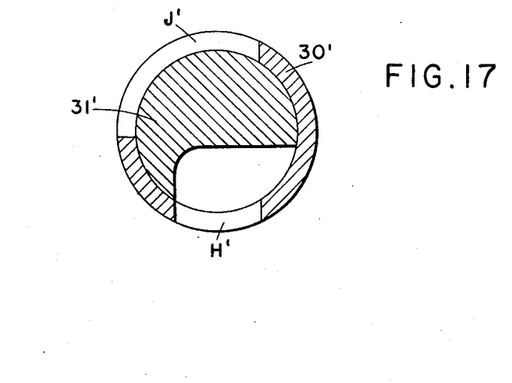
Figure 17 is a vertical, transverse section taken on line 17—17 of Figure 16.

Figures 16 and 17 show a rotary valve performing the same functions as that valve shown in Figure 10, the member 31' being rotated instead of translated to register with the ports. The ports are lettered A' to J', corresponding to those lettered A to J in Figure 10, and perform similar functions. It is obvious that this valve arrangement may be used in place of that shown in Figure 10 in the various diagrams shown.

While the thermal elements 4 have been shown for purposes of illustration as a spiral, the thermal element can be of other well known types such as a bellows, Sylphons or other elements translating temperature changes to motion.

To those skilled in the art, it will be evident that while the same thermostatic means may control these functions, the predetermined temperatures and routing of the outlet oil may be varied at will regardless of the sequence of operations of the main valve function.

Although the invention has been described and illustrated in connection with a cylindrical slide valve, the principles involved are susceptible of numerous other designs such as a rotation of a cylindrical valve element, instead of translation, and other means not necessarily circular in form. The invention is, therefore, limited only as indicated by the scope of the appended claims.

I claim as my invention:

1. In a valve, a body which has in it a recess, a wall which subdivides the recess into an inlet chamber and an outlet chamber, a port through which fluid enters the inlet chamber, a port through which fluid leaves the outlet chamber, a member disposed in one of the chambers and mounted so that it can move within it, means which defines two paths by which fluid may pass from the inlet chamber to the outlet chamber including two ports which open into the side of the chamber in which the member is disposed and a port which opens into the other chamber, and means by which the member may be moved to and from a position in which a portion thereof closes either and leaves open the other of the second specified ports, including a bimetal thermostat disposed within the outlet chamber between the ports through which fluid enters and leaves it.

2. In a valve, a body which has in it a recess, a wall which subdivides the recess into an inlet chamber and an outlet chamber, a port through which fluid enters the inlet chamber, a port through which fluid leaves the outlet chamber, a member disposed in one of the chambers and mounted so that it can move along the axis thereof within it, means which defines two paths by which fluid may pass from the inlet chamber to the outlet chamber including two ports which open into the side of the chamber in which the member is disposed and a port which opens into the other chamber, and means by which the member may be moved along the axis thereof to and from a position in which a portion thereof closes either and leaves open the other of the second specified ports.

3. In a valve, a body which has in it a recess, a wall which subdivides the recess into an inlet chamber and an outlet chamber, a port through which fluid enters the inlet chamber, a port through which fluid leaves the outlet chamber, a member disposed in one of the chambers and mounted so that it can move along the axis thereof within it, means which defines two paths by which fluid may pass from the inlet chamber to the outlet chamber including two ports which open into the side of the chamber in which the member is disposed and a port which opens into the other chamber, and means by which the member may be moved along the axis thereof to and from a position in which a portion thereof closes either and leaves open the other of the second specified ports, including a bimetal thermostat disposed within the outlet chamber between the ports through which fluid enters and leaves it.

4. A valve comprising a housing having a valve chamber formed with a main inlet port, a main outlet port and a plurality of auxiliary inlet and outlet ports communicating therewith, a valve member positioned within said chamber, said valve member being formed to provide fluid passages communicating with said inlet and outlet ports and being mounted for movement within said chamber through three positions, said valve member in a first position affording a first fluid flow path directly from the main inlet port to the main outlet port, said valve member in a second position affording a second fluid flow path from said main inlet port to said main outlet port through one pair of said auxiliary outlet and inlet ports respectively, and in a third position affording a third fluid flow path from said main inlet port to said main outlet port through a second pair of said auxiliary outlet and inlet ports respectively, and a temperature responsive element secured to the valve member to move the latter through said three positions, said temperature responsive element being located adjacent the outlet port whereby it is directly responsive to the fluid flowing through each of said paths to move the valve member to a position in accordance with the temperature of the fluid at said outlet port.

5. A valve comprising a housing having a valve chamber formed with a main inlet port, a main outlet port and a plurality of auxiliary inlet and outlet ports communicating therewith, a valve member positioned within said chamber, said valve member being formed to provide fluid passages communicating with said inlet and outlet ports and being mounted for movement within said chamber through three positions, said valve member in a first position affording a first fluid flow path directly from the main inlet port to the main outlet port, said valve member in a second position affording a second fluid flow path from said main inlet port to said main outlet port through one pair of said auxiliary outlet and inlet ports respectively, and in a third position affording a third fluid flow path from said main inlet port to said main outlet port through a second pair of said auxiliary outlet and inlet ports respectively, and a temperature responsive element secured to the valve member to move the latter through said three positions, said temperature responsive element being located adjacent the outlet port whereby it is directly responsive to the fluid flowing through each of said paths to move the valve member to a position in accordance with the temperature of the fluid at said outlet port, said valve member including portions cooperating with said auxiliary ports, when in any one of said three positions, to block the flow of fluid through the other two paths.

6. In a valve, a body having a recess formed therein, a member movably mounted within said recess and including a wall which divides said recess into an inlet chamber and an outlet chamber, a main inlet port communicating with said inlet chamber and a main outlet port communicating with the outlet chamber, means defining two paths by which fluid may pass from the inlet chamber to the outlet chamber including two auxiliary ports adapted to open into one of said chambers and an auxiliary port adapted to open into the other of said chambers, said member being provided with surfaces adapted to selectively open and close said auxiliary ports, and means including a temperature responsive element disposed within the outlet chamber and responsive to the temperature of the fluid flowing through either of said paths to move said member so as to selectively close one and leave open the other of said first mentioned auxiliary ports.

7. In a valve, a body which has in it a recess, a wall which subdivides the recess into an inlet chamber and an outlet chamber, a port through which fluid enters the inlet chamber, a port through which fluid leaves the outlet chamber, a member disposed in one of the chambers and mounted so that it can move within it, means which defines two paths by which fluid may pass from the inlet chamber to the outlet chamber including two ports which open into the side of the chamber in which the member is disposed and a port which opens into the other chamber, and means by which the member may be moved to and from a position in which a portion thereof closes either and leaves open the other of the second specified ports, including temperature responsive means connected to the member and disposed within the outlet chamber between the ports through which fluid enters and leaves it.

LESLIE T. MILLER.

REFERENCES CITED

The following references are of record in the file of this patent:

UNITED STATES PATENTS

| Number | Name | Date |
|---|---|---|
| 1,311,809 | Giesler | July 29, 1919 |
| 1,414,780 | Giesler | May 2, 1922 |
| 1,707,109 | Blair | Mar. 26, 1929 |
| 1,858,454 | Lund | May 17, 1932 |
| 1,925,686 | Chism | Sept. 5, 1933 |
| 2,189,814 | McNeal | Feb. 13, 1940 |
| 2,288,599 | Ramsaur | July 7, 1942 |
| 2,325,058 | Howard | July 27, 1943 |

FOREIGN PATENTS

| Number | Country | Date |
|---|---|---|
| 18,825 | Great Britain | 1911 |
| 350,065 | Italy | July 5, 1937 |
| 371,173 | Italy | May 13, 1939 |

OTHER REFERENCES

Sarco, Catalog sheet, A. I. A. File 29—D 21, Sarco No. 140, published June 1936 by the Sarco Company Incorporated, 188 Madison Avenue, New York, New York, 2 pages.